United States Patent [19]
Brown et al.

[11] 3,846,797
[45] Nov. 5, 1974

[54] FORWARD AREA ALERTING SENSOR NETTING SYSTEM

[75] Inventors: James E. Brown, Somerville; Andrew B. Woods, Decatur, both of Ala.; Howard S. Kliger, Altamonte Springs, Fla.

[73] Assignee: The United States of America as represented by the Secretary of the Army, Washington, D.C.

[22] Filed: Sept. 25, 1972

[21] Appl. No.: 292,199

[52] U.S. Cl............ 343/6 R, 343/6 A, 343/112 TC
[51] Int. Cl............................................. G01s 9/00
[58] Field of Search....... 343/5 R, 6 R, 7 ED, 6.5 R, 343/112 TC, 112 PT, 6 A

[56] References Cited
UNITED STATES PATENTS
| | | | |
|---|---|---|---|
| 2,557,949 | 6/1951 | Deloraine............................ | 343/6 R |
| 2,745,095 | 5/1956 | Stoddard............................. | 343/6 R |
| 2,972,141 | 2/1961 | Barlow et al....................... | 343/5 R |
| 3,560,971 | 2/1971 | Alsberg et al...................... | 343/6 R |

FOREIGN PATENTS OR APPLICATIONS
| | | | |
|---|---|---|---|
| 972,858 | 10/1964 | Great Britain................ | 343/112 TC |
| 779,473 | 7/1957 | Great Britain................ | 343/112 PT |

*Primary Examiner*—Maynard R. Wilbur
*Assistant Examiner*—G. E. Montone
*Attorney, Agent, or Firm*—Edward J. Kelly; Herbert Berl; Aubrey J. Dunn

[57] ABSTRACT

A system using several sensors in a battlefield area, with groups of sensors in communication with sensor netting stations. Each sensor netting station broadcasts air traffic data to terminal users in its area. The sensors may be radars, infrared detectors, etc., and the sensor netting station includes communications to each sensor, processing facilities for handling aircraft I.D. and eliminating redundant targets, and communications to terminal users. The terminal users may include missile or gun batteries, tank or infantry columns, etc.

5 Claims, 6 Drawing Figures

FORWARD AREA ALERTING SENSOR NETTING SYSTEM

SUMMARY OF THE INVENTION

The invention is an air defense alerting system for use in a battlefield area. Groups of sensors such as radars feed respective sensor netting stations. Each sensor netting station includes a time shared, single frequency communication net, facilities for I.F.F. information handling and for eliminating redundant target information, a communication net for its respective terminal users, and a communication link to other sensor netting stations or other air defense systems alerting facilities.

GENERAL DESCRIPTION OF THE INVENTION

Figure 1:
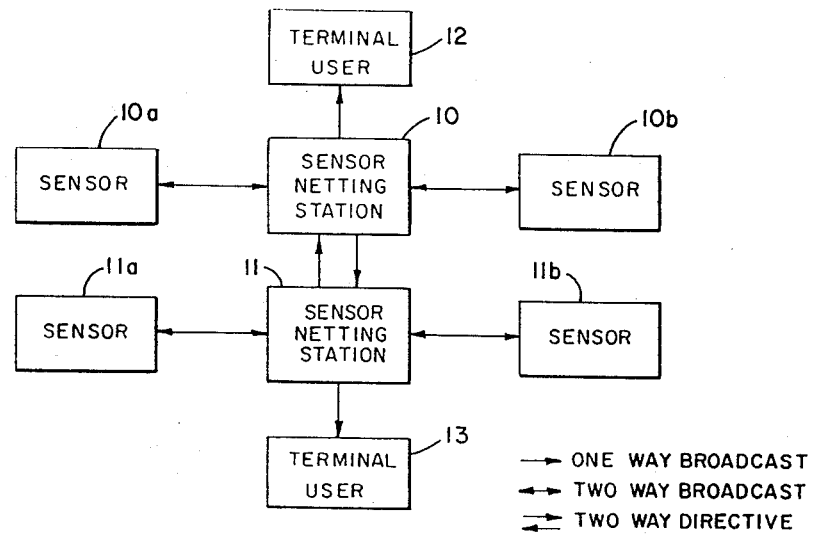
FIG. 1 is a diagram of the invention.

An overall discussion of the system operation may be in order before a detailed description is made. Referring to FIG. 1, the inventive system includes sensor netting stations such as 10 and 11. A single sensor netting station may also be used, with its information passed on to a higher echelon than the division area with which this description is mainly concerned. Each station is fed by one or more sensor(s), such as 10a and 10b for station 10 and 11a and 11b for station 11. Terminal users are supplied data by a sensor netting station, such as respective users 12 and 13 for stations 10 and 11. The netting stations may be linked to each other by a communication system. The sensors need be nothing more than men with fieldglasses, but may be radars or infrared sensors. In any event, the sensors, except for their message handling portions, are old and well known in the art. The sensors are linked to the sensor netting stations by a two-way omnidirectional single frequency radio broadcast net. For the sake of description, the sensors may be assumed to be radars. These radars detect targets and perform I.F.F. functions in their usual manner. The target-friend information is parallax corrected to a master grid allowing for the position of each radar on the master grid. This parallax corrected information is then broadcast for reception by the sensor netting station in communication with the respective sensor.

The information received in each sensor netting station is separated as to friend and foe and further separated (as to foe) into high and low altitude targets. The target information from its sensors and the other sensor netting station(s) is checked for redundancy by the sensor netting station. The station then transmits friend information via the sensor netting station/sensor-net to its other respective sensors. It also broadcasts friend and target information to terminal users with friend data being broadcast quadrant-wise. Additionally, both friend and target information is transmitted from the sensor netting station in a two-way directive (narrow beam) radio channel to the other sensor netting stations and/or higher level commands.

The information broadcast from the sensor netting stations is received by the terminal users and displayed. Although not heretofore mentioned, all of the communications taking place in the inventive system are in the form of digital data. Each user makes a parallax correction for the information received to relate the user's position to the master grid. Obviously, both the sensors and users are free to move about in the division area, and need only change their parallax corrections for their information to be correct. The users may be anything from missile emplacements to squads of infantry. The transmission of friend data to the sensors from the sensor netting stations allows a friend to move about the division area without being overinterrogated for identification purposes.

DETAILED DESCRIPTION OF THE INVENTION

Figure 2:
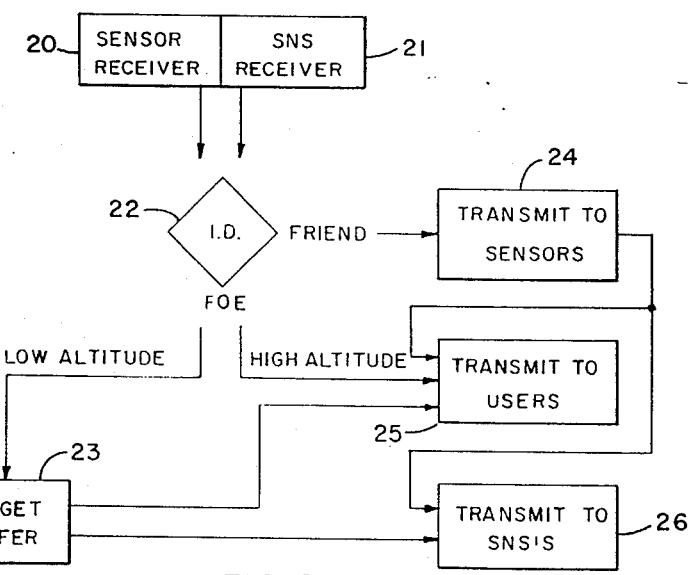
FIG. 2 is a functional diagram of a sensor netting station of FIG. 1.

The sensor netting station of FIG. 2 includes sensor receiver 20, sensor netting station receiver 21, identification information handler (I.D.) 22, target buffer 23, a transmitter 24 for the sensors, transmitter 25 for the terminal users net and transmitter 26 for the link to the other sensor netting stations or higher commands. Receiver 21 and transmitter 26 provide a communication link between stations 10 and 11 and/or higher commands (FIG. 1). The I.D. separates target information as to friends and foes and furnishes the friend information to the sensors to avoid overinterrogation. Target buffer 23 stores information so that checks for redundant targets may be made before the information is broadcast to the terminal users.

Figure 3:
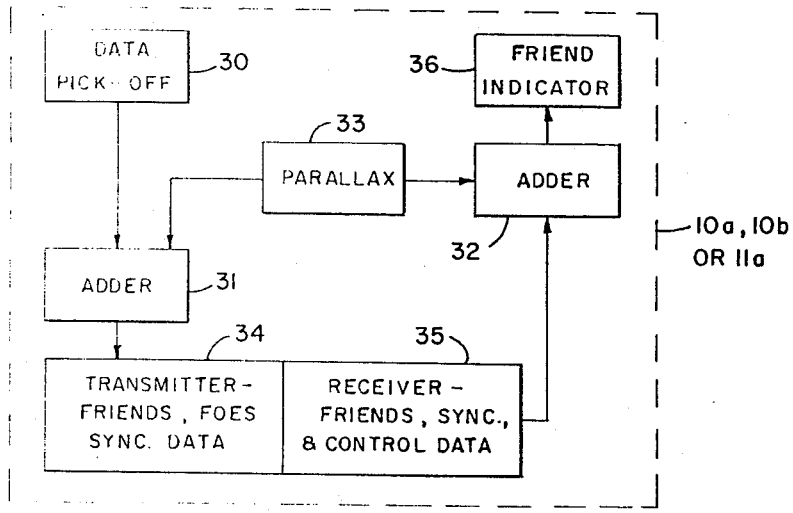
FIG. 3 is a functional diagram of a sensor of FIG. 1.

FIG. 3 shows some of the details of one of the sensors of FIG. 1. Each sensor includes a data pick-off 30. Information from 30 is an input to adder 31. Also, adder 31 and adder 32 each is controlled from parallax unit 33. Unit 33 allows the sensor to be located any place in the master grid area by merely adding a dialed-in location to all data received or sent. In effect this references all data to a predetermined grid reference point. Parallax-corrected target information from adder 31 is transmitted by transmitter 34 to a sensor netting station. Information concerning target I.D. is received by receiver 35. Friend indicator 36 displays parallax-corrected friend information from receiver 35 to prevent the sensor from unnecessarily interrogating a friend.

Figure 4:
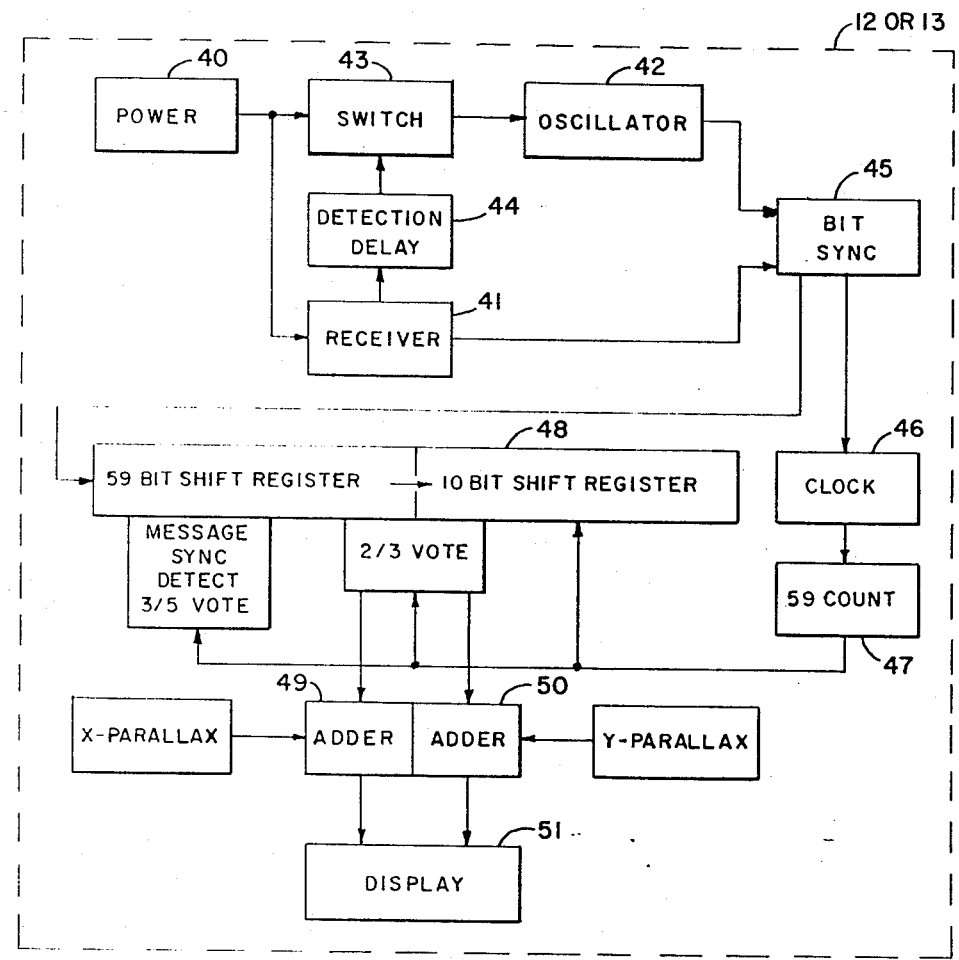
FIG. 4 is a data flow diagram of one of the terminal users of FIG. 1.

FIG. 4 shows an operational diagram of a typical terminal user, such as 12 or 13 of FIG. 1. This user is designed so as to use a minimum amount of battery power 40 while awaiting a target to be displayed. While waiting, only receiver 41 is being powered. Prior to the sending of a target, the transmitter at the SNS broadcasts information necessary to put the user in proper bit sync and message sync. When the first few bits are received, detector 44 is activated and switches on oscillator 42. Bit sync logic 45 is then powered up and the user is operating within proper bit sync. Immediately after sending the information to get the user into good bit sync, a message sync word is transmitted. This sync message puts the user into message sync so that information on targets may be sampled at the proper time. Master clock 46 and 59 bit counter 47 are then started in preparation for target information to be put into 59 bit shift register 48. On each count of counter 47 the information is shifted into shift register 48. On the 59th count, information on the target is in the proper position of the shift register and the votes are taken to determine information accuracy. After a given amount of time the intention is to transmit another sync message for the use of those terminals switching on late. A method whereby those terminal users already in sync will disregard the data and not consider it as valid information has been determined. Certain bits of the 59 bit shift register are stored for a two-word count and a ⅔ vote is taken on this information to ascertain whether or not a sync message will follow. When it is determined that the information is indeed valid and not a message sync, the data is transferred to the display circuitry via the X and Y adders 49 and 50. In these adders the X and Y parallax correctors are set externally by the operator and are added to the data received. If the adjusted data is then within the limits of the display 51, the video appears as output.

Figure 5:
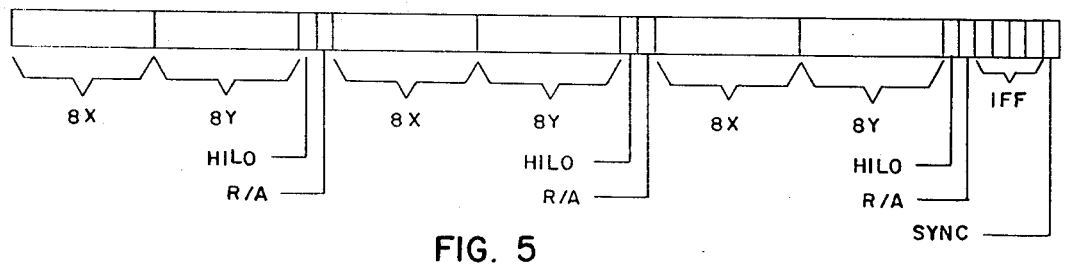
FIG. 5 is a chart showing a typical message format for the system.

A typical message makeup is shown in FIG. 5. As can be seen, the message consists of an 8 bit X code, 8 bit Y, 1 bit HILO (for high or low targets), 1 bit R/A (remove/add, to indicate addition or deletion of a target), 4 I.F.F. bits, and 1 sync bit. The portion of the message which contains the target information (8X — 1 R/A) is repeated 3 times and a ⅔ vote taken in the terminal user as described above. The I.F.F. portion of the message is sent only once per message and a 170 vote is carried out every 3 messages. Each bit represents a particular quadrant and gives information on whether or not a friend is in the quadrant.

Figure 6:
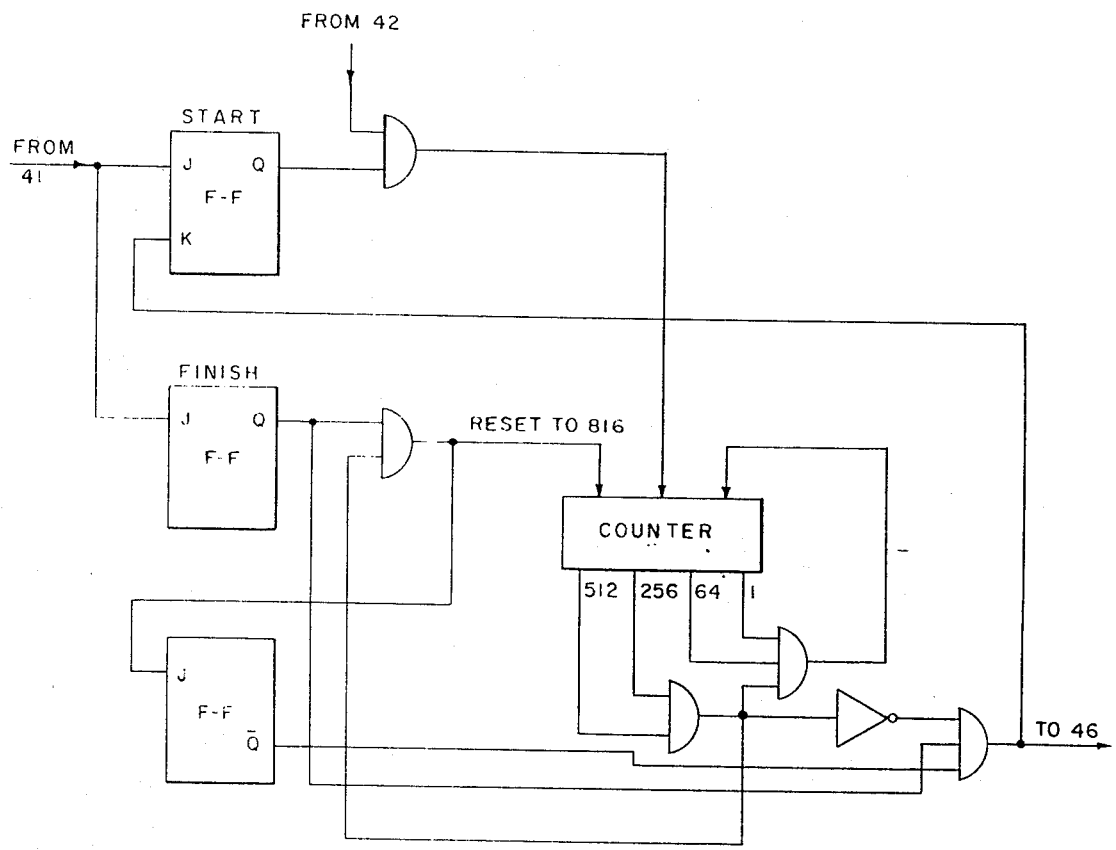
FIG. 6 is a functional diagram of a portion of the bit sync 45 of FIG. 4.

Bit synchronization may be readily achieved with a minimum number of broadcast sync bits with FIG. 6. It should first be understood that receiver 41 provides proper amplification and/or waveshaping, if needed, of received signals and provides "clean" transitions to bit sync 45. Obviously noise may also be sent as short pulses to 45, but will not adversely affect the operation of 45. Referring now to FIG. 6, which shows a portion of the contents of 45; we see that this contains three J-K flip-flops, five AND gates, one inverting amplifier, and a counter. The Start and Finish flip-flops act as transition detectors and detect opposite transitions (i.e., from 0 to 1 and 1 to 0). When a transition sets the "Start" flip-flop, the counter starts (at a megahertz rate, much higher than the bit rate) and continues to count until an opposite transition sets the Finish flip-flop. The count information is compared to the known (predetermined) bit duration to see if it is within tolerance. A feedback loop then accurately adjusts the opening of the sampling gates to insure proper bit sync by rejecting noise pulses. In this way bit sync can be achieved and maintained should the bit length vary. It should be understood that 45 will gate information from 41 and feed the bits to 48. This information is in the form of a message of the FIG. 5 format. The circuit of FIG. 6 is thus not only able to achieve bit synchronism with a minimum number of bits, but is able to accomodate bits of varying width, within tolerance.

We claim:

1. A forward area alerting sensor netting system including a plurality of sensor netting stations; a plurality of sensors, with at least one of said sensors linked to each of said sensor netting stations; and a plurality of terminal users; and means in said stations for broadcasting information for said users; wherein said sensor netting stations are linked to respective sensors by first communication means including a first receiver and a first transmitter and are linked to said terminal users by second communications means including a second receiver and a second transmitter; and identification handling means having inputs connected to said first and second receivers and having a friend output and two foe outputs; target buffer means, connected between one of said foe outputs and said second transmitter, the other foe output also connected to said second transmitter, and said friend output connected to said first transmitter; wherein each of said sensors includes data pick-off means; first and second adder means each having an output and first and second inputs; parallax correcting means connected to the first input of each of said adders; said data pick-off means connected to the second input of said first adder; means for transmitting to said first receiver of said first communication means; means for receiving from said first transmitter of said first communication means; said output of said first adder connected to said means for transmitting; the output of said means for receiving connected to said second input of said second adder; friend indicating means; said output of said second adder connected to said friend indicating means.

2. The system as set forth in claim 1 wherein each of said terminal users includes: power supply means; means for receiving from said second transmitter, powered by said power supply means, with said last-named means for receiving having an output; pulse oscillator means having an output; switch means connected between said pulse oscillator means and said power supply means; detection delay means connected between said receiver means and said switch means for energizing said switch means; bit sync means having inputs connected respectively to said output of said oscillator means and to the output of said last-named means for receiving and having an output; clock means having an input connected to said output of said bit sync means and having an output; shift register means connected to the output of said bit sync means; counting means connected between said clock means and said shift register means; means associated with said shift register means for comparing information in different portions of said shift register means and including an output means for giving an output related to the bits in said shift register means; adder means having inputs, with ones of said inputs connected to said last-mentioned output means and having outputs; parallax correcting means connected to respective inputs of said adder means; display means having inputs connected to said outputs of said adder means; and message sync detecting means included with said shift register means.

3. The system as set forth in claim 2 wherein said means associated includes means for taking a ⅔ vote of the bits in said shift register means.

4. The system as set forth in claim 1 further including third communication means to between said sensor netting station and higher commands.

5. The system as set forth in claim 4 wherein said bit sync means includes counter means operable by said pulse oscillator means; transition detecting means for starting and stopping said counter; gating means for sampling the bits; and feedback means controlled by said counting means for operating said gating means.

* * * * *